(12) United States Patent
Juni (10) Patent No.: US 8,031,994 B2
(45) Date of Patent: Oct. 4, 2011

(54) OPTICAL WAVEGUIDE FOR TOUCH PANEL AND TOUCH PANEL USING THE SAME

(75) Inventor: Noriyuki Juni, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 267 days.

(21) Appl. No.: 12/401,414

(22) Filed: Mar. 10, 2009

(65) Prior Publication Data

US 2009/0225059 A1    Sep. 10, 2009

Related U.S. Application Data

(60) Provisional application No. 61/043,502, filed on Apr. 9, 2008.

(30) Foreign Application Priority Data

Mar. 10, 2008   (JP) .................................. 2008-059581

(51) Int. Cl.
  *G02B 6/26*   (2006.01)
  *G02B 6/42*   (2006.01)
  *G06F 3/042*  (2006.01)

(52) U.S. Cl. ............. 385/43; 385/46; 345/175; 345/176

(58) Field of Classification Search .................... 385/39, 385/42, 43, 46, 48; 345/173, 175, 176
See application file for complete search history.

(56) References Cited

U.S. PATENT DOCUMENTS

| 6,404,957 B1 | 6/2002 | Shin et al. | |
| 6,463,188 B1 * | 10/2002 | Takahashi et al. | 385/14 |
| 7,369,724 B2 * | 5/2008 | Deane | 385/33 |
| 7,421,167 B2 | 9/2008 | Charters et al. | |
| 2002/0114572 A1 | 8/2002 | Bouda | |
| 2004/0201579 A1 | 10/2004 | Graham et al. | |

(Continued)

FOREIGN PATENT DOCUMENTS

CN   1218913 A   6/1999

(Continued)

OTHER PUBLICATIONS

European Serarch Report dated Dec. 7, 2009, issued in corresponding European Patent Application No. 09154710.9.

(Continued)

*Primary Examiner* — Daniel Petkovsek
(74) *Attorney, Agent, or Firm* — Westerman, Hattori, Daniels & Adrian, LLP (57) ABSTRACT

An optical waveguide for a touch panel in which the intensity of light beams emitted from light-emitting portions of a plurality of light-emitting cores in the form of branches is substantially uniform independently of the branch position of the light-emitting cores, and a touch panel using the same. An optical waveguide for a touch panel is provided in which a plurality of light-emitting cores 33 are formed by dividing a tip portion of a single original core into branches. A portion extending from a basal portion 32*b* of the original core to a branch point 32*c* at which the division into the branches serving as the light-emitting cores 33 starts is an isosceles triangular portion 32 gradually widened from the basal portion 32 into the shape of an isosceles triangle. The isosceles triangle has a taper angle θ in the range greater than 0 degrees and less than 15 degrees.

2 Claims, 8 Drawing Sheets

U.S. PATENT DOCUMENTS

2006/0188198 A1    8/2006    Charters et al.
2008/0074402 A1*    3/2008    Cornish et al. ................ 345/176

FOREIGN PATENT DOCUMENTS

| | | |
|---|---|---|
| CN | 1260060 A | 7/2000 |
| CN | 101103289 A | 1/2008 |
| JP | 2006-215102 A | 8/2006 |
| WO | 98/40844 A1 | 9/1998 |

OTHER PUBLICATIONS

Chinese Office Action dated Jun. 2, 2011, issued in corresponding Chinese Patent Application No. 200910127014.9.

* cited by examiner

PRIOR ART

Fig. 6

INVENTIVE EXAMPLE 1  $\theta = 14.5°$, $L = 5.5\,mm$

INVENTIVE EXAMPLE 2  $\theta = 10.7°$, $L = 7.5\,mm$

INVENTIVE EXAMPLE 3  $\theta = 5.3°$, $L = 15.0\,mm$

INVENTIVE EXAMPLE 4  $\theta = 4.0°$, $L = 20.0\,mm$

COMPARATIVE EXAMPLE 1  $\theta = 15.9°$, $L = 5.0\,mm$

Fig. 7

CONVENTIONAL EXAMPLE 1    L = 5.5 mm

CONVENTIONAL EXAMPLE 2    L = 7.5 mm

CONVENTIONAL EXAMPLE 3    L = 15.0 mm

CONVENTIONAL EXAMPLE 4    L = 20.0 mm

Fig. 8

PRIOR ART

OPTICAL WAVEGUIDE FOR TOUCH PANEL AND TOUCH PANEL USING THE SAME

RELATED APPLICATIONS

This application claims the benefit of U.S. Provisional Application No. 61/043,502, filed Apr. 9, 2008, which is hereby incorporated by reference.

BACKGROUND OF THE INVENTION

1. Field of the Invention

The present invention relates to an optical waveguide for a touch panel, and a touch panel using the same.

2. Description of the Related Art

Touch panels are input devices for operating an apparatus by directly touching a display screen of a liquid crystal display device or the like with a finger, a purpose-built stylus or the like. The touch panels include a display which displays operation details and the like, and a detection means which detects the position (coordinates) of a portion of the display screen of the display touched with the finger or the like. Information indicative of the touch position detected by the detection means is sent in the form of a signal to the apparatus, which in turn performs an operation and the like displayed on the touch position. Examples of the apparatus employing such a touch panel include ATMs in banking facilities, ticket vending machines in stations, portable game machines, and the like.

A detection means employing an optical waveguide is proposed as the detection means for detecting the finger touch position and the like on the above-mentioned touch panel (see, for example, US 2004/0201579A1). Specifically, the touch panel includes optical waveguides provided around a periphery of a display screen of a rectangular display. The touch panel is configured to emit a multiplicity of light beams parallel to the display screen of the display from light-emitting portions of a light-emitting optical waveguide provided on one side portion of the display screen of the display toward the other side portion, and to cause the light beams to enter light-receiving portions of a light-receiving optical waveguide provided on the other side portion. These optical waveguides cause the light beams to travel in a lattice form on the display screen of the display. When a portion of the display screen of the display is touched with a finger in this state, the finger blocks some of the light beams. Therefore, the light-receiving optical waveguide senses a light blocked portion, whereby the position of the above-mentioned portion touched with the finger is detected.

Figure 8:
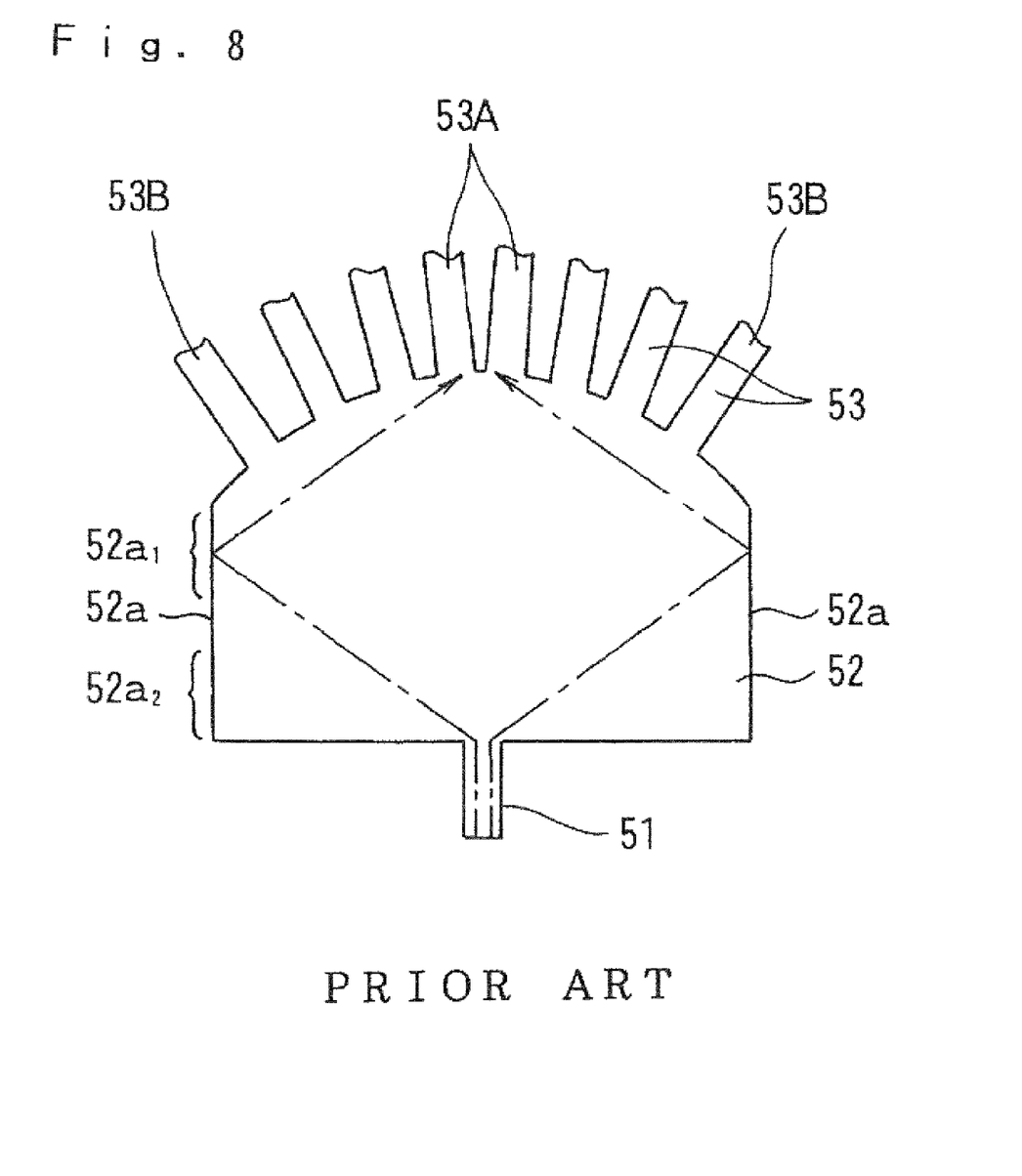
FIG. 8 is a plan view schematically showing a conventional core branch structure.

The multiplicity of light beams emitted from the above-mentioned light-emitting optical waveguide are light beams emitted from the light-emitting portions (tips) of a multiplicity of light-emitting cores, respectively, which are arranged along the one side portion of the display screen of the display. As the multiplicity of light-emitting cores, there have been proposed light-emitting cores 53 formed by dividing a tip portion of a single original core into a multiplicity of branches fanned outwardly, as shown in FIG. 8 (see US2006/0188198A1). The branch structure of the original core includes a substantially rectangular widened portion 52, a strip-shaped rear end portion 51 extending from the rear end of this widened portion 52, and the multiplicity of light-emitting cores 53 fanned outwardly from the front end of the above-mentioned widened portion 52 as a branch point. The above-mentioned strip-shaped rear end portion 51 has an optical axis (not shown) extending in the longitudinal direction thereof.

However, the multiplicity of light-emitting cores 53 in the form of the branches fanned outwardly as disclosed in US 2006/0188198A1 described above are disadvantageous in that light beams emitted from the light-emitting portions of light-emitting cores 53A near the center of the fanned-out configuration thereof (light-emitting cores near the extension of the optical axis of the rear end portion 51 of the original core) are of high intensity, and light beams emitted from the light-emitting portions of light-emitting cores 53B near opposite ends of the fanned-out configuration thereof are of lower intensity. When such an optical waveguide is used as the touch position detection means for a touch panel, the finger touch position cannot be detected in some cases in the low-intensity portion.

The present inventor has made studies to diagnose the cause of the nonuniform intensity of the light beams emitted from the light-emitting portions of the above-mentioned light-emitting cores 53 depending on the branch position of the light-emitting cores 53. As a result, the present inventor has found that the above-mentioned problem lies in the shape of the above-mentioned widened portion 52 and in the light beams reflected therefrom.

Specifically, the above-mentioned widened portion 52 is of a substantially rectangular configuration widened leftwardly and rightwardly with respect to the rear end portion 51 of the original core, as shown in FIG. 8. A majority of light beams coming through the rear end portion 51 of the original core into the above-mentioned widened portion 52 travel toward the light-emitting cores 53. Some of the light beams, however, travel toward both left-hand and right-hand side surfaces 52a of the widened portion 52, as indicated by alternate long and short dashed lines shown. The light beams traveling toward the left-hand and right-hand side surfaces 52a reach front side portions 52a, of the left-hand and right-hand side surfaces 52a of the above-mentioned widened portion 52, but scarcely reach rear side portions $52a_2$ of the left-hand and right-hand side surfaces 52a because the light beams are required to be bent at generally right angles to travel. Thus, the reflection of the light beams from the above-mentioned left-hand and right-hand side surfaces 52a occurs at the front side portions $52a_1$ of the left-hand and right-hand side surfaces 52a. The light beams reflected from such specific areas reach also a specific area, as indicated by the alternate long and short dashed lines shown. For this reason, the reflected light beams enter specific ones (near the center) of the multiplicity of light-emitting cores 53 in the form of the branches. As a result, both the light beams emitted along the optical axis of the rear end portion 51 of the original core and the reflected light beams enter the light-emitting cores 53A near the center among the multiplicity of light-emitting cores 53 fanned outwardly to result in the higher intensity of light beams in the light-emitting cores 53A than in the other light-emitting cores 53B. Such a phenomenon is considered to result in the nonuniform intensity of the light beams emitted from the light-emitting portions of the multiplicity of light-emitting cores 53 in the form of the branches depending on the branch position of the light-emitting cores 53.

DISCLOSURE OF THE INVENTION

In view of the foregoing experience, it is an object of the present invention to provide an optical waveguide for a touch panel in which the intensity of light beams emitted from light-emitting portions of a plurality of light-emitting cores in the form of branches is substantially uniform independently of the branch position of the light-emitting cores, and a touch panel using the same.

To accomplish the above-mentioned object, a first aspect of the present invention is an optical waveguide for a touch panel comprising an under cladding layer, a core branch structure formed on the under cladding layer, and an over cladding layer formed on the under cladding layer so as to cover the core branch structure, the core branch structure including an isosceles triangular portion, and a plurality of light-emitting cores having light-emitting portions arranged along a first side portion of a display screen of a display of the touch panel, said plurality of light-emitting cores being formed by dividing a tip portion of a single original core into branches, said isosceles triangular portion being configured to extend from a basal portion of the original core to a branch point at which the division into the branches serving as the light-emitting cores starts and being gradually widened from the basal portion into the shape of an isosceles triangle, wherein an angle formed by two sides equal in length of the isosceles triangle is in the range greater than 0 degrees and less than 15 degrees.

A second aspect of the present invention is a display having a display screen, a first optical waveguide for light emission and a second optical waveguide for light reception corresponding to said first optical waveguide, said first optical waveguide being placed on a first side portion of the display screen of said display, said first optical waveguide being the above-mentioned optical waveguide for a touch panel, said second optical waveguide being placed on a second side portion of the display screen of said display, said second optical waveguide including a plurality of light-receiving cores having light-receiving portions opposed to said light-emitting portions and arranged along the second side portion of the display screen of said display.

To solve the above-mentioned problems, the present inventor has made studies of a core branch structure, based on the above-mentioned experience. As a result, the present inventor has found that, when the above-mentioned branch structure is a structure such that the portion extending from the basal portion of the original core to the branch point at which the division into the branches serving as the light-emitting cores starts is gradually widened from the basal portion into the shape of the isosceles triangle and the angle formed by the two sides equal in length of the isosceles triangle is in the range greater than 0 degrees and less than 15 degrees, the intensity of light beams emitted from the light-emitting portions of the plurality of light-emitting cores in the form of the branches is substantially uniform independently of the branch position of the light-emitting cores. Thus, the present inventor has attained the present invention.

Figure 3A:
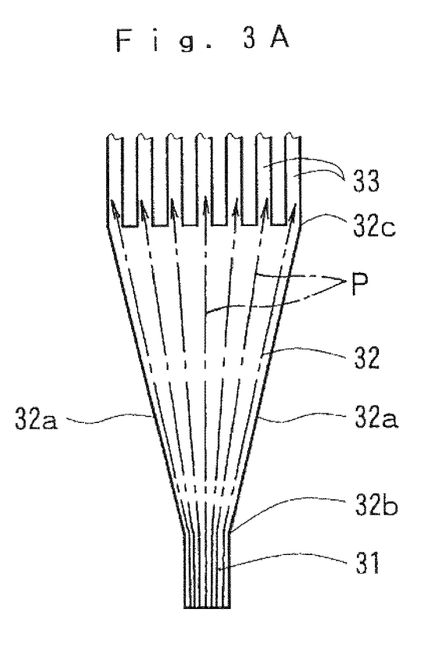
FIGS. 3A and 3B are illustrations schematically showing how light beams travel in an isosceles triangular portion of the above-mentioned optical waveguide for the touch panel.

As shown in FIG. 3A, a majority of light beams coming through a strip-shaped rear end portion 31 of the original core into a basal portion 32b of the above-mentioned isosceles triangular portion 32 are substantially uniformly dispersed and travel substantially uniformly into entrances to (rear ends of) the plurality of light-emitting cores 33 in the form of the branches because of the isosceles triangular configuration, as indicated by alternate long and short dashed lines shown. Some of the light beams coming into the above-mentioned basal portion 32b and reflected from tapered side surfaces 32a (surfaces corresponding to the two sides equal in length of the isosceles triangle) of the above-mentioned isosceles triangular portion 32 are directed toward the branch point 32c of the light-emitting cores 33 because of the tapered configuration of the reflecting surfaces, as indicated by alternate long and short dashed lines in FIG. 3B. Depending on the positions of reflection thereof, such light beams travel into the entrances to the plurality of light-emitting cores 33 in appropriate positions. Further, the positions of reflection are distributed substantially uniformly along the length of the above-mentioned tapered side surfaces 32a. For this reason, the light beams reflected from the above-mentioned tapered side surfaces 32a are considered to travel substantially uniformly into the entrances to the plurality of light-emitting cores 33. Such an effect is achieved when the angle formed by the two sides equal in length of the isosceles triangular portion 32 is in the range greater than 0 degrees and less than 15 degrees.

In the optical waveguide for the touch panel according to the present invention, the plurality of light-emitting cores are formed by dividing the tip portion of the single original core into the plurality of branches. The portion extending from the basal portion of the original core to the branch point at which the division into the branches serving as the light-emitting cores starts is gradually widened or increased in width from the basal portion into the shape of the isosceles triangle. The angle formed by the two sides equal in length of the isosceles triangle is in the range greater than 0 degrees and less than 15 degrees. Thus, the optical waveguide for the touch panel according to the present invention is capable of substantially uniformly distributing the light beams coming through the rear end portion of the original core into the basal portion of the above-mentioned isosceles triangular portion among the plurality of light-emitting cores in the form of the branches because of the configuration of the isosceles triangular portion and the reflection from the tapered side surfaces. As a result, the optical waveguide for the touch panel according to the present invention is capable of providing the substantially uniform intensity of the light beams emitted from the light-emitting portions of the plurality of light-emitting cores in the form of the branches independently of the branch position of the light-emitting cores.

The touch panel according to the present invention includes the above-mentioned optical waveguide for the touch panel. Thus, the intensity of the light beams traveling on the display screen of the display is substantially uniform independently of the position on the display screen. If a portion of the display screen of the display near the edge of the display screen is touched with a finger, the optical waveguide for light reception is capable of precisely detecting the position of the portion of the display screen touched with the finger.

DETAILED DESCRIPTION

An embodiment according to the present invention will now be described in detail with reference to the drawings.

Figure 1A:
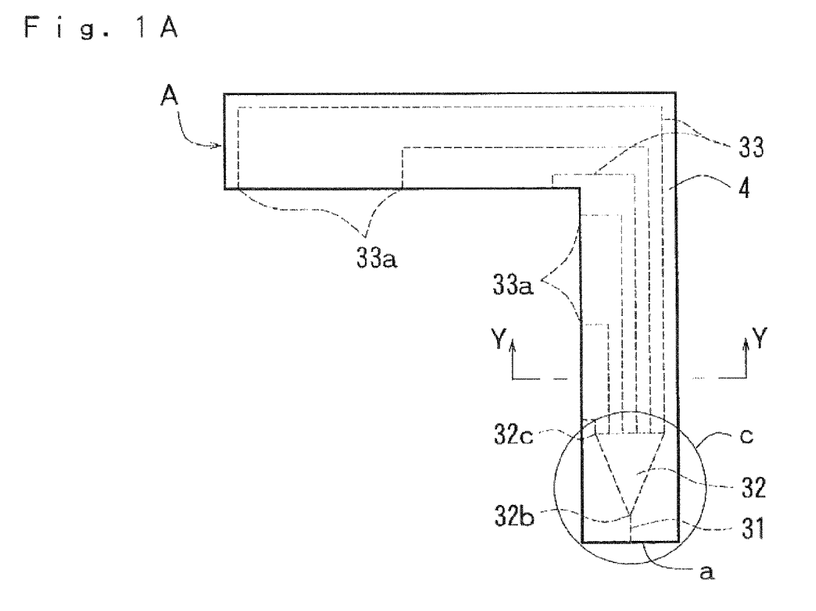
FIG. 1A is a plan view schematically showing an optical waveguide for a touch panel according to an embodiment of the present invention.
Figure 1B:
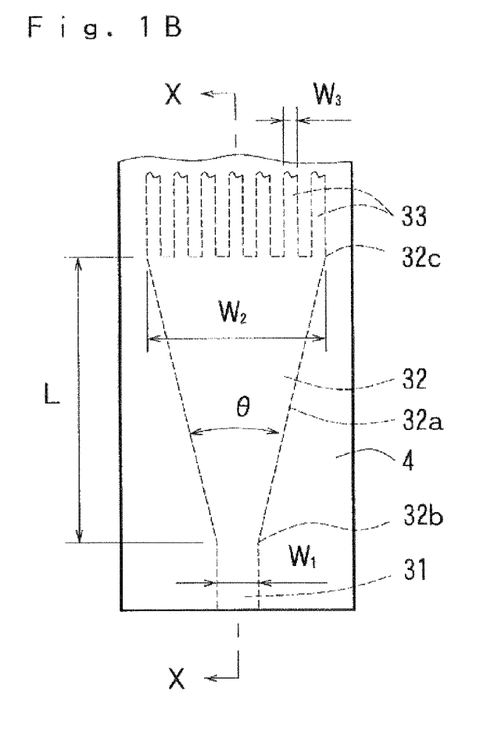
FIG. 1B is a plan view on an enlarged scale of a basal region portion of an original core enclosed with a circle c in FIG. 1A.
Figure 1C:
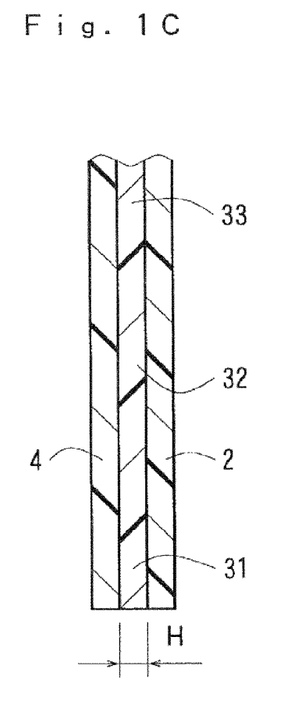
FIG. 1C is a sectional view taken along the line X-X of FIG. 1B.

FIGS. 1A to 1C illustrate an optical waveguide for a touch panel according to an embodiment of the present invention. The optical waveguide for the touch panel according to this embodiment is a substantially L-shaped planar optical waveguide A for light emission which is placed along an L-shaped portion (a first side portion) of a display screen of a display 11 shown in FIG. 2. FIG. 1A shows the condition of the substantially T-shaped planar optical waveguide A before the placement thereof. This substantially L-shaped planar optical waveguide A for light emission is formed such that a tip portion of an original core is divided into a plurality of branches serving as a plurality of light-emitting cores 33 and such that a portion extending from a basal portion 32b of the original core to a branch point 32c at which the division into the branches serving as the light-emitting cores 33 starts is gradually widened or increased in width from the basal portion 32b into the shape of an isosceles triangle. This shape of the isosceles triangle is provided by forming a photosensitive resin layer serving as the original core into the shape of an isosceles triangle.

The above-mentioned substantially L-shaped planar optical waveguide A will be described in detail. The plurality of light-emitting cores 33 for emitting light beams have light-emitting portions (tips) 33a, respectively, which are arranged at equally spaced intervals along the L-shaped inside edge of the substantially L-shaped planar optical waveguide A. The above-mentioned plurality of light-emitting cores 33 are formed by dividing the tip portion of the single original core into the plurality of branches, as shown in FIG. 1B which is an enlarged view of an original core basal portion enclosed with a circle c in FIG. 1A. According to the present invention, the portion extending from the basal portion 32b of the original core to the branch point 32c at which the division into the branches serving as the light-emitting cores 33 starts is an isosceles triangular portion 32 gradually widened or increased in width from the basal portion 32b into the shape of an isosceles triangle, and an angle (referred to hereinafter as a "taper angle") θ formed by two sides equal in length of the isosceles triangle is in the range greater than 0 degrees and less than 15 degrees. A rear end portion 31 of the above-mentioned original core, the isosceles triangular portion 32 and the light-emitting cores 33 are held between and covered with an under cladding layer 2 and an over cladding layer 4 which are of an L-shaped configuration, as shown in FIG. 1C. In FIG. 1A, the rear end portion 31 of the original core and the light-emitting cores 33 are indicated by broken lines, and the thickness of the broken lines indicates the thickness of the rear end portion 31 of the original core and the light-emitting cores 33. Also, the number of light-emitting cores 33 shown in FIG. 1A is abbreviated. In FIGS. 1A and 1B, the taper angle θ of the above-mentioned isosceles triangular portion 32 is shown as greater for ease of understanding.

Figure 2:
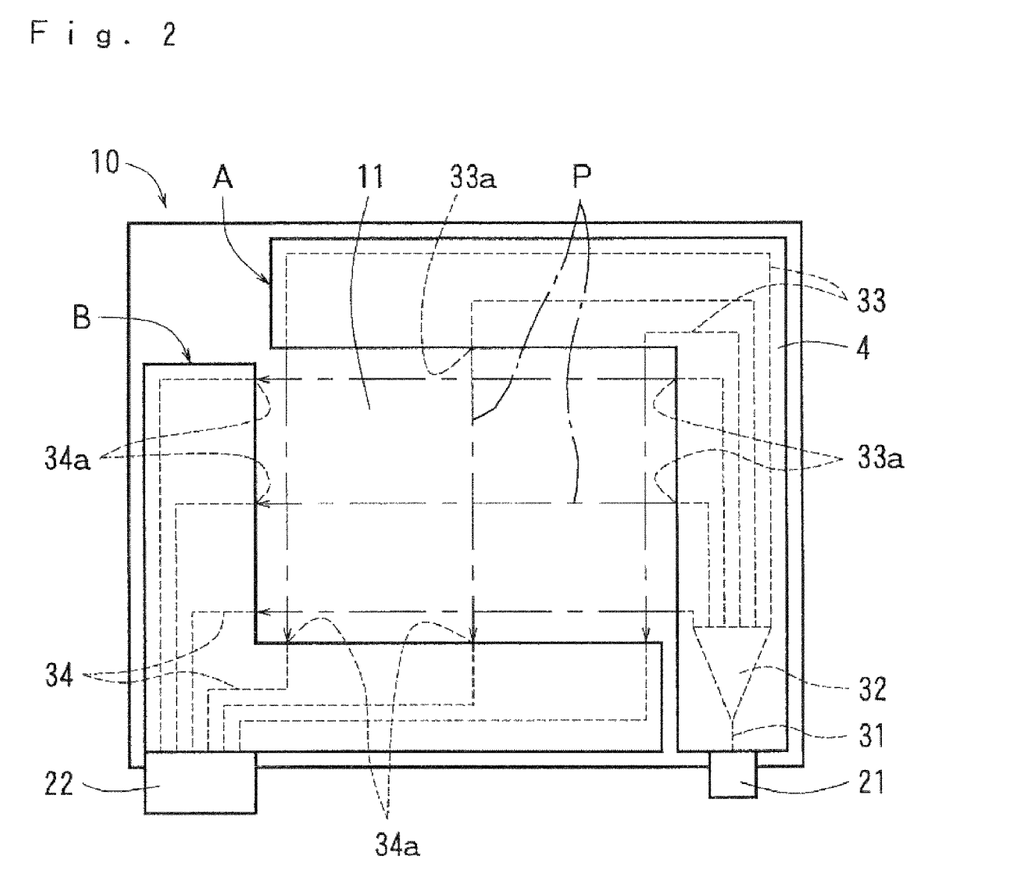
FIG. 2 is a plan view schematically showing a touch panel using the above-mentioned optical waveguide for the touch panel.

In a touch panel 10 using the above-mentioned substantially L-shaped planar optical waveguide A for light emission, a substantially L-shaped planar optical waveguide B for light reception is placed along an L-shaped portion (a second side portion) of the display screen of the display 11 in opposed relation to the above-mentioned substantially L-shaped planar optical waveguide A for light emission, as shown in FIG. 2. Thus, the substantially L-shaped planar optical waveguide A for light emission and the substantially L-shaped planar optical waveguide B for light reception make a pair in the above-mentioned touch panel 10, and are placed to surround the display screen of the rectangular display 11 of the touch panel 10. The above-mentioned substantially L-shaped planar optical waveguide B for light reception includes a plurality of light-receiving cores 34 for receiving light beams and having light-receiving portions (tips) 34a, respectively, which are arranged at equally spaced intervals along the L-shaped inside edge of the substantially L-shaped planar optical waveguide B. The rear end portions of the above-mentioned plurality of light-receiving cores 34 are disposed in an outside corner portion of the above-mentioned substantially L-shaped planar optical waveguide B. As in the above-mentioned substantially L-shaped planar optical waveguide A for light emission, the above-mentioned light-receiving cores 34 are held between and covered with the under cladding layer 2 and the over cladding layer 4 which are of an L-shaped configuration (with reference to FIG. 1C. In the above-mentioned touch panel 10, the light-emitting portions 33a of the light-emitting cores 33 and the light-receiving portions 34a of the light-receiving cores 34 are opposed to each other. A light-emitting element 21 is connected to the rear end portion 31 of the above-mentioned original core at a first end portion a (with reference to FIG. 1A of the substantially L-shaped planar optical waveguide A for light emission, and a light-receiving element 22 is connected to the rear end portions of the light-receiving cores 34 on the outside of the corner portion of the substantially L-shaped planar optical waveguide B for light reception. In FIG. 2, as in FIG. 1A, the rear end portion 31 of the original core, the light-emitting cores 33 and the light-receiving cores 34 are indicated by broken lines, and the thickness of the broken lines indicates the thickness of the rear end portion 31 of the original core, the light-emitting cores 33 and the light-receiving cores 34. Also, the number of light-emitting cores 33 and the number of light-receiving cores 34 shown in FIG. 2 are abbreviated. In FIG. 2, only some light beams P included among a multiplicity of light beams are shown for ease of understanding.

Referring to FIGS. 1A to 1C, the branch structure of the original core in the above-mentioned substantially L-shaped planar optical waveguide A for light emission will be described in further detail. As shown in FIG. 1B, this branch structure includes the rear end portion 31 of the above-mentioned single original core, the above-mentioned isosceles triangular portion 32 formed in contiguous relation to this rear end portion 31, and the above-mentioned plurality of light-emitting cores 33 which use the front end of the isosceles triangular portion 32 as the branch point 32c. The taper angle θ of the above-mentioned isosceles triangular portion 32 is in the range greater than 0 degrees and less than 15 degrees, as mentioned above. If the above-mentioned taper angle θ falls outside this range, the light beams coming through the rear end portion 31 of the original core into the above-mentioned isosceles triangular portion 32 cannot be distributed substantially uniformly among the plurality of light-emitting cores 33 in the form of the branches. As a result, the intensity of the light beams emitted from the light-emitting portions 33a of the plurality of light-emitting cores 33 does not become substantially uniform. The front end width (the width of the most widened portion) $W_2$ of the above-mentioned isosceles triangular portion 32 is preferably equal to but may be greater than the width across the plurality of light-emitting cores 33 in the form of the branches. The number of light-emitting cores 33 is, for example, in the range of 10 to 300. The length L of the above-mentioned isosceles triangular portion 32 is determined by the above-mentioned taper angle θ and the tip width W of the isosceles triangular portion 32. The width $W_1$ of the rear end portion 31 of the original core is typically in the range of 10 to 300 μm, and is greater than the width $W_3$ (typically in the range of 8 to 50 μm) of each of the light-emitting cores 33 in the form of the branches. The height H of the above-mentioned isosceles triangular portion 32 and the light-emitting cores 33 is equal to the height H of the rear end portion 31 of the original core, as shown in section in FIG. 1C, and is typically in the range of 20 to 150 μm.

Figure 3B:
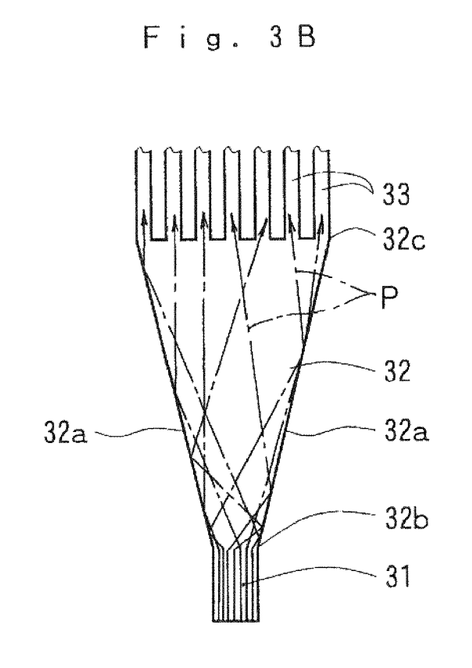

Then, the light beams coming through the rear end portion 31 of the above-mentioned original core into the basal portion 32b of the above-mentioned isosceles triangular portion 32 are distributed substantially uniformly among the plurality of light-emitting cores 33 in the form of the branches, as described earlier with reference to FIGS. 3A and 3B. As a result, the intensity of the light beams emitted from the light-emitting portions 33a (see FIG. 2) of the light-emitting cores 33 becomes substantially uniform independently of the branch position of the light-emitting cores 33. In FIGS. 3A and 3B, the under cladding layer 2 and the over cladding layer 4 (with reference to FIG. 1C are not shown. In FIGS. 3A and 3B as in FIGS. 1A and 1B, the taper angle θ (with reference to FIG. 1B of the isosceles triangular portion 32 is shown as greater for ease of understanding.

In the touch panel 10 shown in FIG. 2 which uses such a substantially L-shaped planar optical waveguide A for light emission, the plurality of light beams P emitted from the substantially L-shaped planar optical waveguide A for light emission travel at a substantially uniform intensity in a lattice form on the display screen of the display 11 (although only some of the light beams P forming the lattice are shown in FIG. 2 for ease of understanding). Thus, when a portion of the display screen of the display 11 is touched with a finger in this state, the position of the above-mentioned portion touched with the finger is precisely detected.

Additionally, the light beams from the above-mentioned light-emitting element 21 are effectively guided to the plurality of light-emitting cores 33 because of reflection from tapered side surfaces 32a of the above-mentioned isosceles triangular portion 32. This reduces optical losses to accordingly reduce the power consumption of the touch panel 10.

Figure 4A:
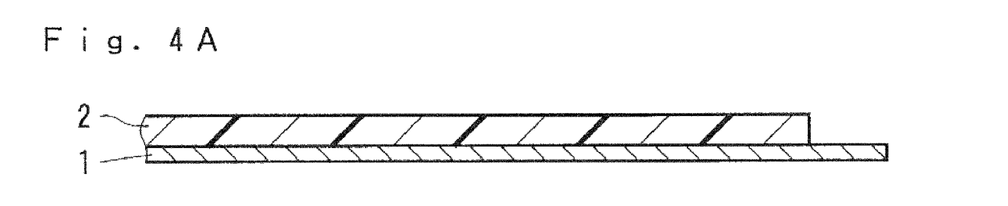
FIGS. 4A to 4C are illustrations schematically showing a manufacturing method of the above-mentioned optical waveguide for the touch panel.
Figure 4B:
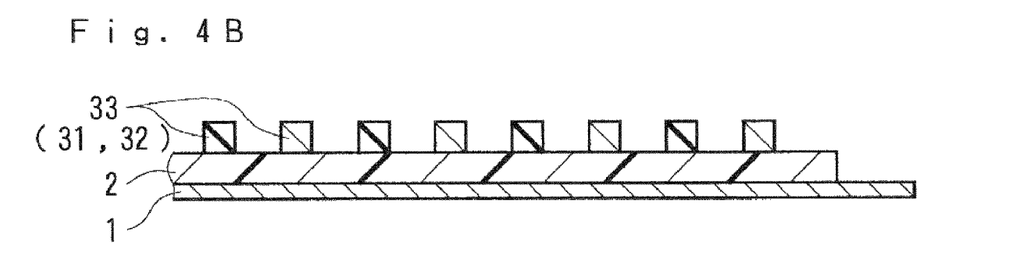
Figure 4C:
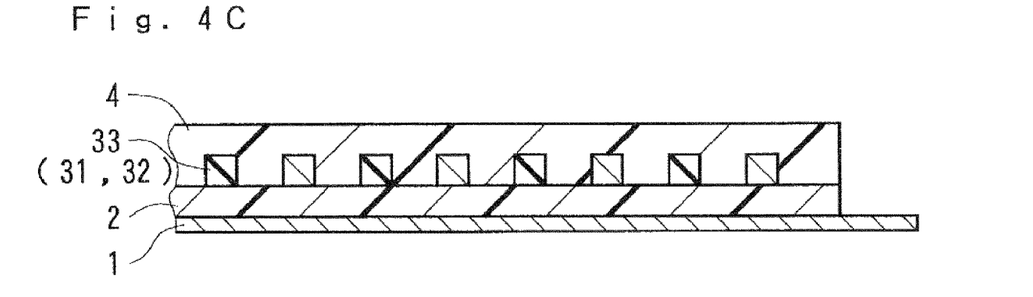

Next, an example of a manufacturing method of the optical waveguide for the touch panel according to the present invention will be described. FIGS. 4A to 4C to which reference is made in this description show sectional views taken along a plane (the plane Y-Y of FIG. 1A) perpendicular to the longitudinal direction of the plurality of light-emitting cores 33 (with reference to FIG. 1A). For this reason, portions of the above-mentioned light-emitting cores 33 will be principally described. However, the remaining core portions (the rear end portion 31 of the original core and the isosceles triangular portion 32) are similar to the above-mentioned light-emitting cores 33.

First, a planar base 1 (with reference to FIG. 4A) for use in the manufacture of the above-mentioned optical waveguide for the touch panel is prepared. Examples of a material for the formation of the base 1 include glass, quartz, silicon, resins, metals and the like. The thickness of the base 1 is, for example, in the range of 20 μm (for a film-like base 11) to 5 mm (for a plate-like base 1).

Next, a varnish prepared by dissolving a photosensitive resin in a solvent, which serves as a material for the formation of the under cladding layer 2 (with reference to FIG. 4A), is applied to a predetermined region on the above-mentioned base 1. The application of the varnish is achieved, for example, by a spin coating method, a dipping method, a casting method, an injection method, an ink jet method and the like. Then, the varnish is dried by a heating treatment at 50° C. to 120° C. for 10 to 30 minutes. This provides a photosensitive resin layer which is to be formed into the under cladding layer 2.

Next, the above-mentioned photosensitive resin layer is exposed to irradiation light. Examples of the irradiation light for the above-mentioned exposure used herein include visible light, ultraviolet light, infrared light, X-rays, alpha rays, beta rays, gamma rays and the like. Preferably, ultraviolet light is used. This is because the use of ultraviolet light achieves irradiation with large energy to provide a high rate of hardening, and an irradiation apparatus therefor is small in size and inexpensive to achieve the reduction in production costs. A light source of the ultraviolet light may be, for example, a low-pressure mercury-vapor lamp, a high-pressure mercury-vapor lamp, an ultra-high-pressure mercury-vapor lamp and the like. The dose of the ultraviolet light is typically 10 to 10000 $mJ/cm^2$, preferably 50 to 3000 $mJ/cm^2$.

After the above-mentioned exposure, a heating treatment is performed to complete a photoreaction. This heating treatment is performed at 80° C. to 250° C., preferably at 100° C. to 200° C., for 10 seconds to two hours, preferably for five minutes to one hour. This forms the above-mentioned photosensitive resin layer into the under cladding layer 2, as shown in FIG. 4A. The thickness of the under cladding layer 2 (the photosensitive resin layer) is typically in the range of 1 to 50 μm, preferably in the range of 5 to 30 μm.

Next, a photosensitive resin layer which is to be formed into the rear end portion 31 of the original core, the isosceles triangular portion 32 and the light-emitting cores 33 (with reference to FIG. 1A) is formed on the surface of the above-mentioned under cladding layer 2. The formation of this photosensitive resin layer is carried out in a manner similar to the method for the formation of the photosensitive resin layer formed into the under cladding layer 2 described with reference to FIG. 4A. Thereafter, this photosensitive resin layer is exposed to light and developed in a manner to be described later to form the rear end portion 31 of the original core, the isosceles triangular portion 32 and the light-emitting cores 33. The material for the formation of the rear end portion 31 of the original core, the isosceles triangular portion 32 and the light-emitting cores 33 used herein is a material having a refractive index greater than that of the materials for the formation of the above-mentioned under cladding layer 2 and the over cladding layer 4 (with reference to FIG. 4C) to be described later. The adjustment of this refractive index may be made, for example, by adjusting the selection of the types of the materials for the formation of the above-mentioned under cladding layer 2, the rear end portion 31 of the original core, the isosceles triangular portion 32 and the light-emitting cores 33, and the over cladding layer 4, and the composition ratio thereof.

The exposure of the above-mentioned photosensitive resin layer to light and the development thereof are carried out in a manner to be described below. Specifically, an exposure mask formed with an opening pattern corresponding to the rear end portion 31 of the original core, the isosceles triangular portion 32 and the light-emitting cores 33 is placed over the photosensitive resin layer. Then, the above-mentioned photosensitive resin layer is exposed to irradiation light through the exposure mask. Thereafter, a heating treatment is performed. The exposure to light and the heating treatment are carried out in a manner similar to those in the method for the formation of the under cladding layer 2.

Subsequently, development is performed using a developing solution to dissolve away an unexposed portion of the above-mentioned photosensitive resin layer, thereby forming the photosensitive resin layer remaining on the under cladding layer 2 into the pattern of the rear end portion 31 of the original core, the isosceles triangular portion 32 and the light-emitting cores 33 (with reference to FIG. 1A), as shown in FIG. 4B. The above-mentioned development employs, for example, an immersion method, a spray method, a puddle method and the like. Examples of the developing solution used herein include an organic solvent, an organic solvent containing an alkaline aqueous solution, and the like. The developing solution and conditions for the development are selected as appropriate depending on the composition of a photosensitive resin composition.

After the above-mentioned development, the developing solution in the remaining photosensitive resin layer formed in the pattern of the rear end portion 31 of the original core, the isosceles triangular portion 32 and the light-emitting cores 33 (with reference to FIG. 1A) is removed by a heating treatment. This heating treatment is typically performed at 80° C. to 120° C. for 10 to 30 minutes. Thus, the remaining photosensitive resin layer formed in the pattern of the rear end portion 31 of the original core, the isosceles triangular portion 32 and the light-emitting cores 33 is solidified and formed into the rear end portion 31 of the original core, the isosceles triangular portion 32 and the light-emitting cores 33.

Next, as shown in FIG. 4C, a photosensitive resin layer which is to be formed into the over cladding layer 4 is formed on the surface of the above-mentioned under cladding layer 2 so as to cover the rear end portion 31 of the original core, the isosceles triangular portion 32 and the light-emitting cores 33 (with reference to FIG. 1A). The formation of this photosensitive resin layer is carried out in a manner similar to the method for the formation of the photosensitive resin layer formed into the under cladding layer 2 described with reference to FIG. 4A. Thereafter, the exposure to light and the heating treatment are carried out in a manner similar to those in the method for the formation of the under cladding layer 2, so that the photosensitive resin layer is formed into the over cladding layer 4. The thickness of the over cladding layer 4 (the photosensitive resin layer) (a thickness as measured from the surface of the rear end portion 31 of the original core, the isosceles triangular portion 32 and the light-emitting cores 33) is typically in the range of 5 to 100 μm, preferably in the range of 10 to 80 μm.

Subsequently, the base 1 is removed from the under cladding layer 2. An example of the method for the removal is as follows. A lower surface of the base 1 is brought into contact with an upper surface of a vacuum suction stage (not shown), and the base 1 is fixed thereon by air suction. Next, a vacuum suction machine (not shown) adheres to an upper surface of the over cladding layer 4 under suction to lift an adhering portion thereof in this state. This removes the under cladding layer 2 of the optical waveguide for the touch panel from the base 1, with the rear end portion 31 of the original core, the isosceles triangular portion 32 and the light-emitting cores 33 (with reference to FIG. 1A), and the under cladding layer 2 as well as the over cladding layer 4 bonded together. The adhesive force between the base 1 and the under cladding layer 2 is smaller than the adhesive force between the over cladding layer 4 and the rear end portion 31 of the original core, the isosceles triangular portion 32 and the light-emitting cores 33), the adhesive force between over cladding layer 4 and the under cladding layer 2 and the adhesive force between the rear end portion 31 of the original core, the isosceles triangular portion 32 and the light-emitting cores 33) and the under cladding layer 2 because of the materials thereof. Thus, the above-mentioned process easily removes the base 1 from the under cladding layer 2.

Then, a portion which becomes the substantially L-shaped planar optical waveguide A for light emission is cut by die-cutting using a cutting die and the like. This provides the intended substantially L-shaped planar optical waveguide A (with reference to FIG. 1A). The substantially L-shaped planar optical waveguide B for light reception (see FIG. 2) may be manufactured in a manner similar to the above-mentioned substantially L-shaped planar optical waveguide A for light emission. Thus, the substantially L-shaped planar optical waveguides A and B may be manufactured by forming portions which become the two above-mentioned substantially L-shaped planar optical waveguides A and B in combination on the single base 1 and then cutting the portions by die-cutting using a cutting die and the like.

In the above-mentioned embodiment, the formation of the under cladding layer 2 and the over cladding layer 4 uses the photosensitive resin as the materials thereof, and is achieved by exposure to light. However, other materials and other methods may be used. As an example, the formation of the under cladding layer 2 and the over cladding layer 4 may use a thermosetting resin such as polyimide resin and epoxy resin as the materials thereof, and may be achieved by applying a varnish prepared by dissolving the thermosetting resin in a solvent and then performing a heating treatment (typically at 300° C. to 400° C. for 60 to 180 minutes) to set the varnish.

In the above-mentioned embodiment, the photosensitive resin is used to form the under cladding layer 2, but other materials may be used. A resin film may be used as the under cladding layer 2. Alternatively, a substrate with a metal film or a metal thin film formed on the surface thereof may be used in place of the under cladding layer 2 so that the surface of the metal material functions as a surface for reflecting the light beams propagating inside the light-emitting cores 33 and the like.

In the above-mentioned embodiment, the two substantially L-shaped planar optical waveguides A and B are used for the touch panel 10. However, the two substantially L-shaped planar optical waveguides A and B may be integrated at their opposite ends together into a rectangular frame-shaped configuration. The manufacturing method thereof includes the step of cutting into the rectangular frame-shaped configuration in place of the step of cutting into two substantially L-shaped planar configurations in the above-mentioned manufacturing method of the optical waveguide for the touch panel.

Next, inventive examples of the present invention will be described in conjunction with a comparative example and conventional examples. It should be noted that the present invention is not limited to the inventive examples.

EXAMPLES

Inventive Examples 1 to 4, Comparative Example 1 and Conventional Examples 1 to 4

Material for Formation of Under Cladding Layer and Over Cladding Layer

A material for formation of an under cladding layer and an over cladding layer was prepared by mixing 35 parts by weight of bisphenoxyethanol fluorene glycidyl ether (component A) represented by the following general formula (I), 40 parts by weight of 3',4'-epoxycyclohexylmethyl-3,4-epoxycyclohexane carboxylate which is an alicyclic epoxy resin (CELLOXIDE 2021P manufactured by Daicel Chemical Industries, Ltd.)(Component B), 25 parts by weight of (3',4'-epoxycyclohexane)methyl-3',4'-epoxycyclohexyl-carboxylate (CELLOXIDE 2081-manufactured by Daicel Chemical Industries, Ltd.) (Component C), and 2 parts by weight of a 50% propione carbonate solution of 4,4'-bis[di(β-hydroxyethoxy)phenylsulfinio]phenyl-sulfide-bis-hexafluoroantimonate (component D).

(1)

wherein $R_1$ to $R_6$ are hydrogen atoms, and n=1.

Material for Formation of Core

A material for formation of a core was prepared by dissolving 70 parts by weight of the aforementioned component A, 30 parts by weight of 1,3,3-tris[4-{2-(3-oxetanyl)]butoxyphenyl}butane and one part by weight of the aforementioned component D in 28 parts by weight of ethyl lactate.

Production of Optical Waveguide for Touch Panel

The material for the formation of the above-mentioned under cladding layer was applied to the surface of a polyethylene naphthalate (PEN) film [160 mm×160 mm×188 μm (thick)] by a spin coating method. Thereafter, exposure by the use of irradiation with ultraviolet light at 2000 mJ/cm² was performed. Subsequently, a heating treatment was performed at 100° C. for 15 minutes to form the under cladding layer. The thickness of this under cladding layer was 25 μm when measured with a contact-type film thickness meter. The refractive index of this under cladding layer at a wavelength of 830 nm was 1.502.

Figure 5:
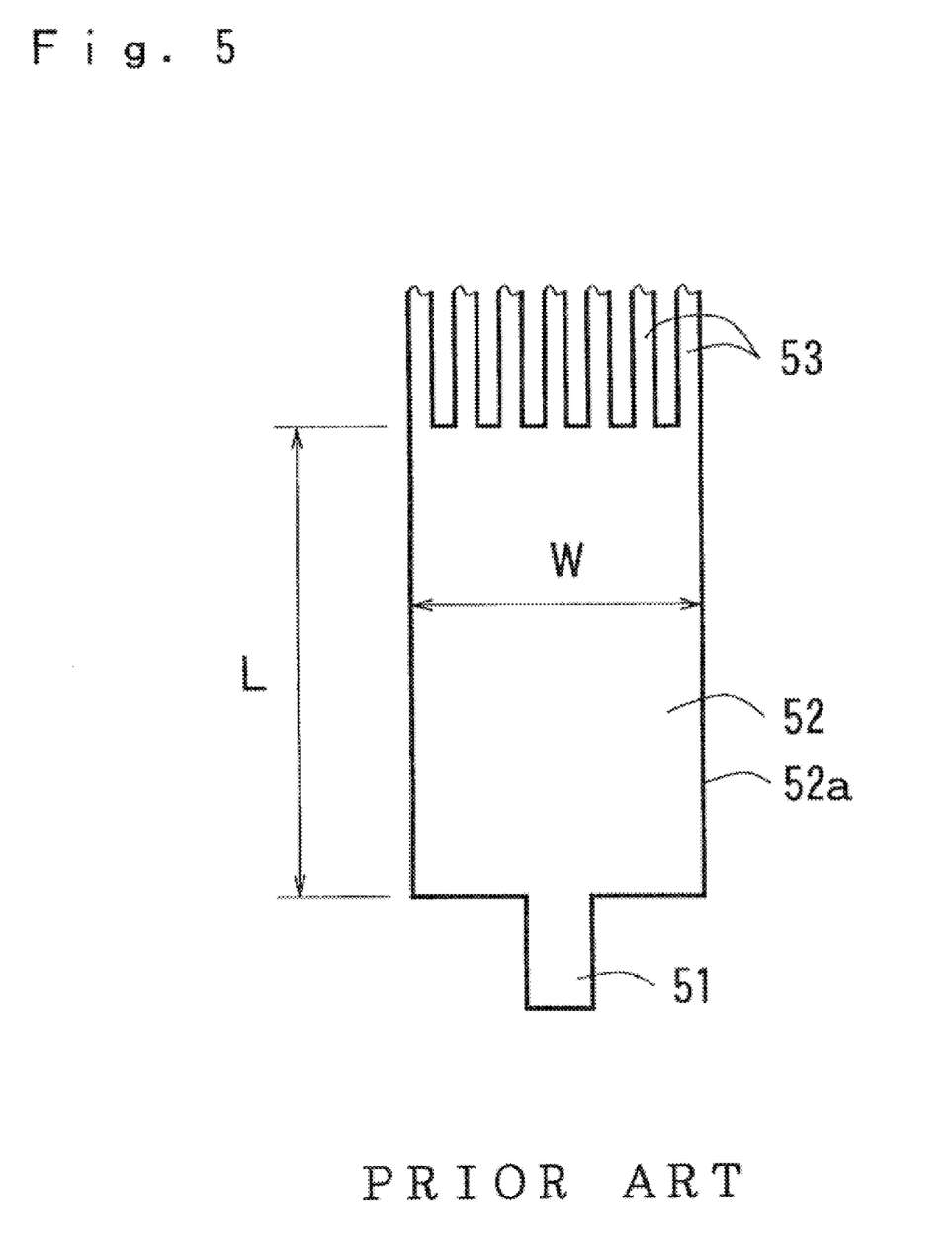
FIG. 5 is a plan view schematically showing a branch structure of conventional examples.

Next, the material for the formation of the above-mentioned core was applied to the surface of the above-mentioned under cladding layer by a spin coating method. Thereafter, a drying process was performed at 100° C. for 15 minutes. Next, a synthetic quartz chrome mask (exposure mask) formed with an opening pattern identical in shape with a core pattern was placed over the resulting core material. Then, exposure by the use of irradiation with ultraviolet light at 4000 mJ/cm² was performed by a contact exposure method from over the mask. Thereafter, a heating treatment was performed at 120° C. for 15 minutes. Next, development was carried out using an aqueous solution of γ-butyrolactone to dissolve away an unexposed portion. Thereafter, a heating treatment was performed at 120° C. for 30 minutes to form the core. This core had a structure such that a tip portion of a single original core was divided into 50 branches. The configuration of the branch structure portion was an isosceles triangular configuration (see FIG. 1B) in Inventive Examples 1 to 4 and Comparative Example 1, and was a rectangular configuration (see FIG. 5) having a width (W) of 1.5 mm in Conventional Examples 1 to 4. The dimensions of the branch structure portion of the core [the taper angle (θ) and the length (L) of the isosceles triangular portion] were set at values listed in Tables 1 and 2 below by the use of the above-mentioned chrome mask (exposure mask) formed with an opening pattern corresponding to the dimensions thereof. The dimensions of a rear end portion of the original core in cross section were 100 μm in width×30 μm in height. The dimensions of a plurality of light-emitting cores in the form of the branches in cross section were 15 μm in width×30 μm in height. The above-mentioned dimensions were measured with an SEM (electron microscope). The refractive index of the core at a wavelength of 830 nm was 1.588. In FIG. 5, the reference numerals 51 to 53 are similar to those in FIG. 8 (Prior Art). The reference numeral 51 designates a rear end portion of a single original core, the reference numeral 52 designates a widened portion, and the reference numeral 53 designates light-emitting cores in the form of branches.

Next, the material for the formation of the above-mentioned over cladding layer was applied to the surface of the above-mentioned under cladding layer by a spin coating method so as to cover the above-mentioned core. Then, exposure by the use of irradiation with ultraviolet light at 2000 mJ/cm² was performed. Subsequently, a heating treatment was performed at 150° C. for 60 minutes to thereby form the over cladding layer. The thickness of the over cladding layer was 60 μm when measured with a contact-type film thickness meter. The refractive index of the over cladding layer at a wavelength of 830 nm was 1.502.

Thereafter, the above-mentioned PEN film was removed from the under cladding layer. This provided an optical waveguide for a touch panel.

Emitted Light Intensity Distribution

Figure 6:
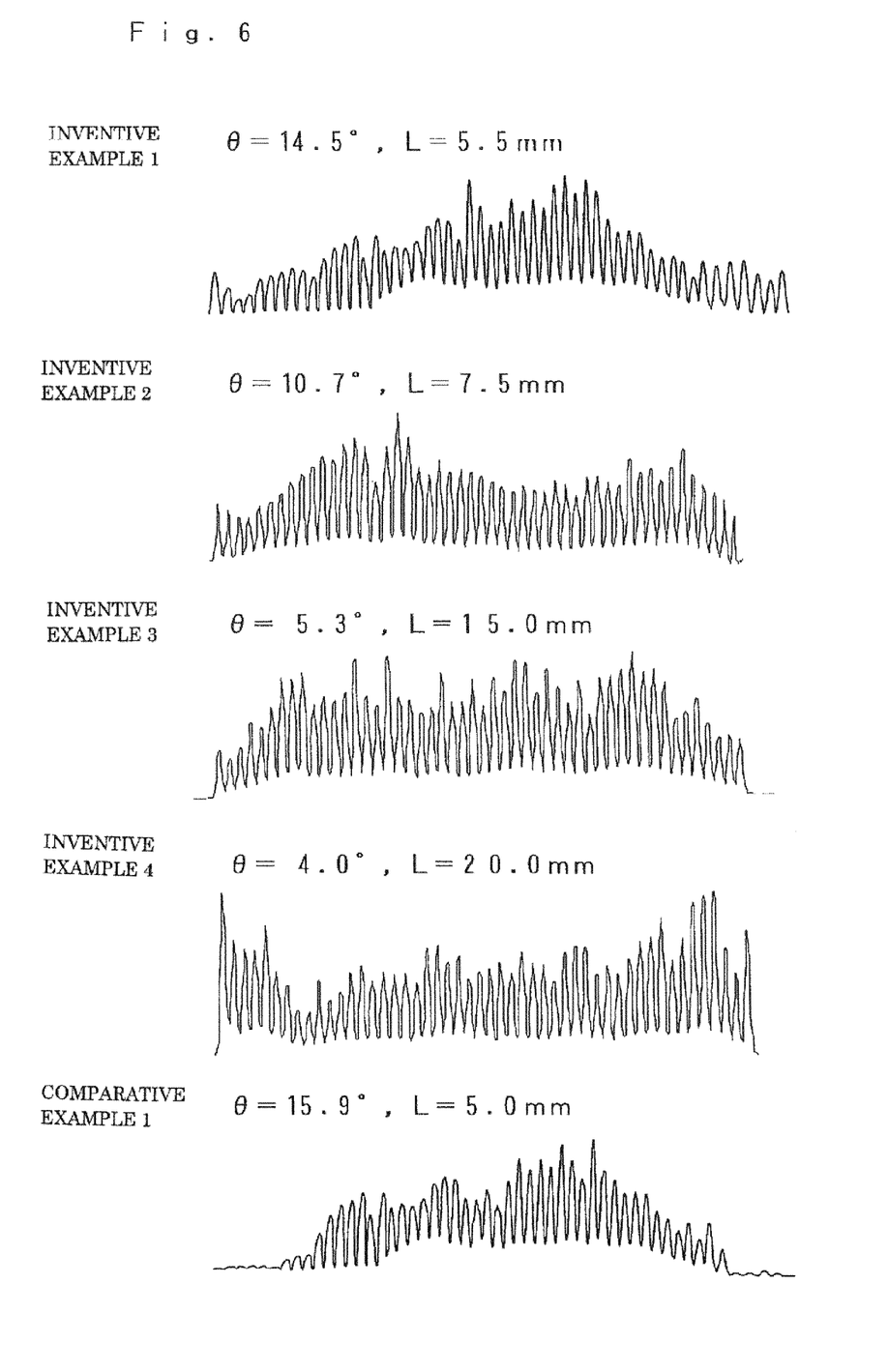
FIG. 6 is a graph showing an emitted light intensity according to inventive examples and a comparative example.
Figure 7:
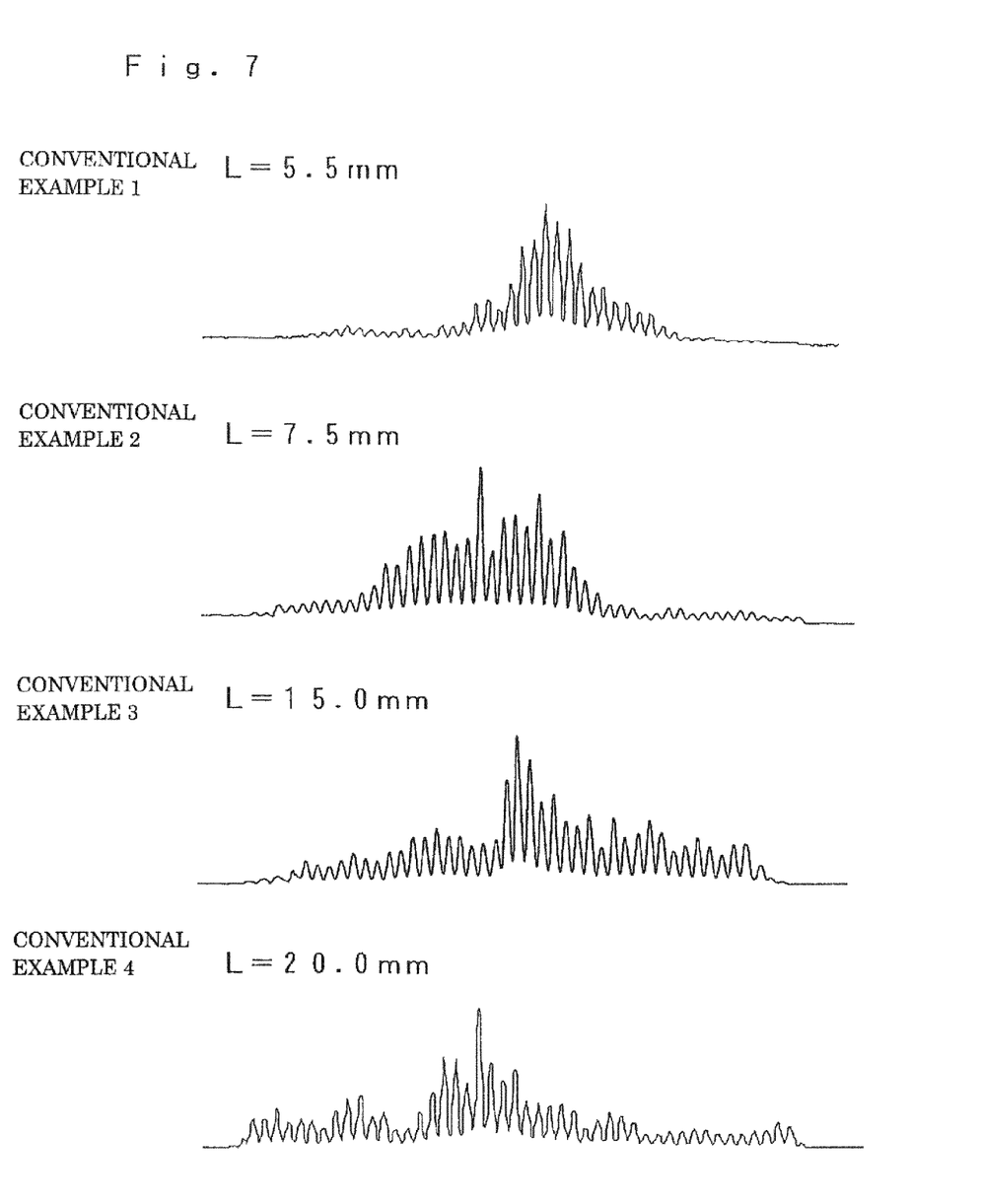
FIG. 7 is a graph showing an emitted light intensity according to the conventional examples.

The 50 light-emitting cores of the resultant optical waveguides for a touch panel were cut at a position spaced 5 mm apart from a branch point of the light-emitting cores. Then, a light-emitting element [VCSEL (Vertical Cavity Surface Emitting Laser)] was connected to the rear end portion of the original core, and light beams were emitted from the light-emitting element. The intensity of the light beams at the cut surfaces of the above-mentioned 50 light-emitting cores at that time was measured with a laser beam profiler (manufactured by Hamamatsu Photonics K.K.). Graphs of the intensity are shown in FIGS. 6 and 7. Peaks in the graphs denote the intensity of the light beams emitted from the above-mentioned 50 light-emitting cores. In the above-mentioned graphs, the light intensity recognized as being substantially uniform was evaluated as being "good" and indicated by an open circle (○), and the light intensity not so recognized was evaluated as being "unacceptable" and indicated by across (X). The results of the evaluation were also shown in Tables 1 and 2 below.

TABLE 1

| | | Inventive Examples | | | | Comp. Example |
|---|---|---|---|---|---|---|
| | | 1 | 2 | 3 | 4 | 1 |
| Isosceles Triangular Portion | Taper Angle θ (Degree) | 14.5 | 10.7 | 5.3 | 4.0 | 15.9 |
| | Length L (mm) | 5.5 | 7.5 | 15.0 | 20.0 | 5.0 |
| Uniformity of Light Intensity | | ○ | ○ | ○ | ○ | X |

TABLE 2

|  |  | Conventional Examples | | | |
|---|---|---|---|---|---|
|  |  | 1 | 2 | 3 | 4 |
| Rectangular Portion | Width W (mm) | | 1.5 | | |
|  | Length L (mm) | 5.5 | 7.5 | 15.0 | 20.0 |
| Uniformity of Light Intensity | | X | X | X | X |

The results in Tables 1 and 2 show the following. In the optical waveguides for a touch panel according to Inventive Examples 1 to 4, the branch structure is formed in the shape of an isosceles triangle, and the taper angle thereof is within a specific range (greater than 0 degrees and less than 15 degrees). Therefore, the uniformity of the intensity of the light beams emitted from the 50 light-emitting cores in the form of the branches in the optical waveguides for a touch panel according to Inventive Examples 1 to 4 is enhanced, as compared with those according to Comparative Example 1 and Conventional Examples 1 to 4.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

What is claimed is:

1. An optical waveguide for a touch panel, comprising:
an under cladding layer;
a core branch structure formed on the under cladding layer; and
an over cladding layer formed on the under cladding layer so as to cover the core branch structure,
the core branch structure including an isosceles triangular portion, and a plurality of light-emitting cores having light-emitting portions arranged along a first side portion of a display screen of a display of the touch panel,
said plurality of light-emitting cores being formed to extend in parallel by dividing a tip portion of a single original core into branches,
said isosceles triangular portion being configured to extend from a basal portion of the original core having a width equal to the width of a rear end portion of the single original core to a branch point at which the division into the branches serving as the light-emitting cores starts and being gradually widened from the basal portion into the shape of an isosceles triangle,
wherein an angle formed by two sides equal in length of the isosceles triangle is in the range greater than 0 degrees and less than 15 degrees.

2. A touch panel comprising:
a display having a display screen;
a first optical waveguide for light emission; and
a second optical waveguide for light reception corresponding to said first optical waveguide,
said first optical waveguide being placed on a first side portion of the display screen of said display,
said first optical waveguide comprising:
an under cladding layer;
a core branch structure formed on the under cladding layer; and
an over cladding layer formed on the under cladding layer so as to cover the core branch structure,
the core branch structure including an isosceles triangular portion, and a plurality of light-emitting cores having light-emitting portions arranged along a first side portion of a display screen of a display of the touch panel,
said plurality of light-emitting cores being formed to extend in parallel by dividing a tip portion of a single original core into branches,
said isosceles triangular portion being configured to extend from a basal portion of the original core having a width equal to the width of a rear end portion of the single original core to a branch point at which the division into the branches serving as the light-emitting cores starts and being gradually widened from the basal portion into the shape of an isosceles triangle,
wherein an angle formed by two sides equal in length of the isosceles triangle is in the range greater than 0 degrees and less than 15 degrees,
said second optical waveguide being placed on a second side portion of the display screen of said display,
said second optical waveguide including a plurality of light-receiving cores having light-receiving portions opposed to said light-emitting portions and arranged along the second side portion of the display screen of said display.

* * * * *